(12) United States Patent
Shi et al.

(10) Patent No.: US 6,790,613 B1
(45) Date of Patent: Sep. 14, 2004

(54) METHOD OF PREPARING AN OLIGONUCLEOTIDE ARRAY

(75) Inventors: Song Shi, Phoenix, AZ (US); George Maracas, Phoenix, AZ (US); Vi-En Choong, Chandler, AZ (US)

(73) Assignee: Amersham Biosciences AB, Uppsala (SE)

( * ) Notice: Subject to any disclaimer, the term of this patent is extended or adjusted under 35 U.S.C. 154(b) by 0 days.

(21) Appl. No.: 09/439,889

(22) Filed: Nov. 12, 1999

(51) Int. Cl.[7] ............................ C12Q 1/68; C12M 1/34; C07H 21/00; C07H 21/02; C07H 21/04
(52) U.S. Cl. ................... 435/6; 435/287.2; 536/22.1; 536/23.1
(58) Field of Search ................... 435/174, 177, 435/180, 6, 287.2; 536/23.1, 22.1

(56) References Cited

U.S. PATENT DOCUMENTS

| | | | |
|---|---|---|---|
| 5,552,270 A | 9/1996 | Khrapko et al. | 435/6 |
| 5,616,478 A | 4/1997 | Chetverin et al. | 435/1.2 |
| 5,736,257 A | 4/1998 | Conrad et al. | 428/474.4 |
| 5,741,700 A | 4/1998 | Ershov et al. | 435/287.1 |
| 5,973,014 A | 10/1999 | Funk et al. | 521/64 |

OTHER PUBLICATIONS

Guschin, D., Yershov, G., Zaslavsky, A., Gemmel, A., Shick, V., Proudnikov, D., Arenkov, P., and Mirzabekov, A. 1997. "Manual manufacturing of oligonucleotide, DNA, and protein microchips." *Anal. Biochem.,* vol. 250, No. 2, pp. 203–211.

Righetti, P., Brost, B., and Snyder, R. 1981. "On the limiting pore size of hydrophilic gels for electrophoresis and isoelectric focusing." *J. Biochem. Biophys. Methods,* vol. 4, pp. 347–363.

Blank, Z., and Reimschuessel, A. 1974. "Structural studies of organic gels by SEM." *J. Mater. Sci.,* vol. 9, pp. 1815–1822.

Rouchel, R., and Bager, M. 1975. "Scanning electron microscopic observations of polyacrylamide gels." *Anal. Biochem.,* vol. 68, pp. 415–428.

*Primary Examiner*—David M. Naff
(74) *Attorney, Agent, or Firm*—Royal N. Ronning, Jr.; Stephen G. Ryan; Yonggang Ji

(57) ABSTRACT

This invention relates to the improvement of arrays of porous polymer pads on solid supports used in biological assays. The invention involves freeze drying the porous polymer pads to increase pore size. The increased pore size results in an enhanced ability of the porous polymer pads to bind specific binding substances such as DNA, RNA and polypeptides.

5 Claims, 1 Drawing Sheet

METHOD OF PREPARING AN OLIGONUCLEOTIDE ARRAY

BACKGROUND OF THE INVENTION

1. Field of the Invention

This invention is in the field biochips with arrays of porous polymer pads for analyzing biological samples.

2. Background of the Art

A biochip array is generally comprised of a solid substrate, a supporting matrix and a variety of biomolecule probes immobilized on the supporting matrix. When the biochip is exposed to a target that recognizes one of the immobilized probes, a binding event occurs, which results in a change of an electromagnetic signal such as fluorescence or impedance.

In addition to glass, porous polymer pads, especially polyacrylamide gel pads, have been used as supporting matrices for the attachment of bioactive specimens in a variety of biochip arrays (see U.S. Pat. Nos. 5,552,270; 5,616,478; 5,736,257; 5,741,700). Compared to glass, porous polymers have a much higher probe loading capacity owing to their porous three-dimensional nature.

In conventional polyacrylamide gel pads, the porosity is somewhat limited. The maximum reported pore size for polyacrylamide gel pads is only around 0.6 micron with 60% crossing linker (J. Biochem and Biophys. Methods, 4, 347 (1981). The gel pads with 5% crosslinker (acrylamide/bisacrylamide ratio 19:1) have an average pore size less than 0.1 micron. The pore size is generally believed to be too small for target DNA greater than a couple of hundred base pairs to diffuse into. Thus most binding events will only occur on the surface of the gel pads just as in the case of using glass as the supporting matrix. It is especially true for detection that requires some enzymatic reactions since enzyme molecules are generally much bigger in size and will not diffuse into small pores. To take advantage of the high loading capacity of porous polymer pads, it is necessary to have the ability to control the pore size distribution so that the target molecules can easily diffuse into the porous pads to be detected by the immobilized probes.

SUMMARY OF THE INVENTION

The invention involves the improvement of arrays of porous polymer pads on a solid support used in biological assays. The improvement involves freeze drying the porous polymer pads on solid support to increase the pore size. Thus it is an object of the invention to provide an array of macroporous polymer pads having specific binding agents such as DNA, RNA or polypeptides for use in biological assays. The invention provides for enhanced sensitivity by incorporating a larger amount of specific binding substance. Typically, an array of porous polymer pads on a solid support is frozen at liquid nitrogen temperatures and solvent is removed by sublimation of reduced pressure.

DETAILED DESCRIPTION OF THE INVENTION

Figure 1A:
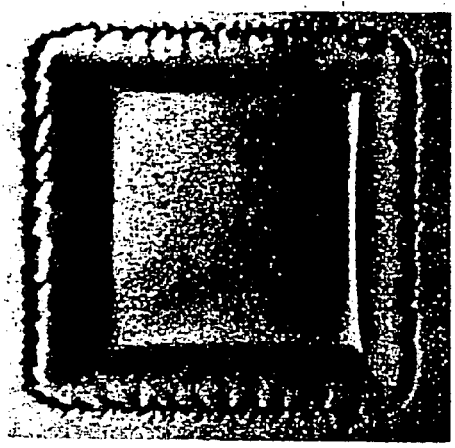
FIG. 1A is a top view of an optical image of a porous polymer gel pad before freeze drying.
Figure 1B:
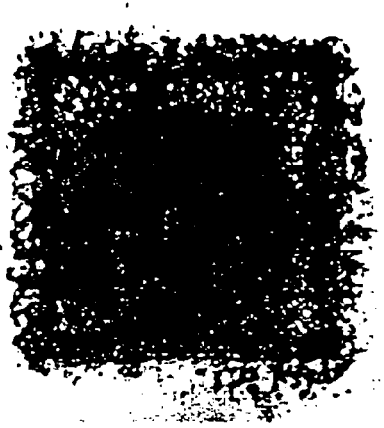
FIG. 1B is a top view of an optical image of a porous polymer gel pad after freeze drying.
Figure 2A:
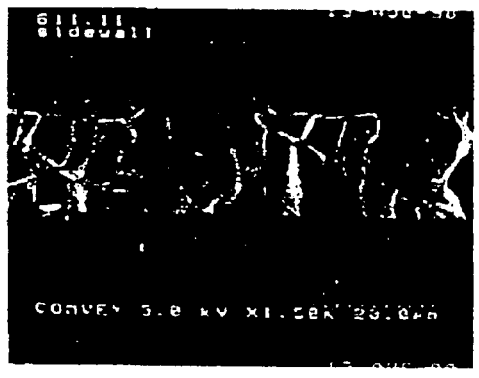
FIG. 2A is a cross section view scanning-election microscope image FIG. 1B.
Figure 2B:
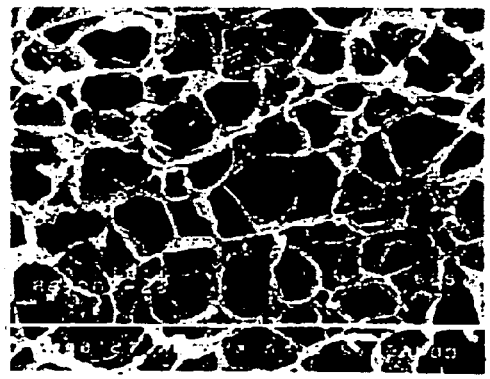
FIG. 2B is a top view of FIG. 1B.

Freeze-drying is based on the principal that under the right conditions, a solid material such as ice can change directly into a gas without first passing through a liquid phase. This process, called sublimation, gradually removes all ice from food, other biological matter, organic material such as polymers and even from inorganic substances such as ceramics.

Freeze drying technique has been used to study polyacrylamide gels. In the middle of 70s, two publications involving freeze-drying and critical point-drying under conditions that prevented the gel matrix from shrinking during dehydration, scanning-electron microscopy revealed a spongelike closed cell structure in polyacrylamide gels (Z. Blank and A. C. reimschuessel, J. Mater. Sci. 9(1974) 1815; R. Rouchel and M. D. Bager, Anal. Biochem., 68(1975) 415.). To study the porosity of polyacrylamide gels, Rouchel et.al (R. Rouchel, R. L. Steere, and E. F. Erbe, J. Chromatography, 166 (1978) 563–575) freeze-etched a slab gel cut from 0.2 mm thick gel sheets. By freeze-etching the slab gel and depositing platinum and carbon films on the freeze-etched surface, replicas of the polyacrylamide gels were prepared. Under transmission-electron microscopy, submicron size of pores was observed in the polyacrylamide gel pads.

Polyacrylamide biochips are made by selective photopolymerization of materials such as acrylamides. The general techniques are described in U.S. Pat. Nos. 5,552,270; 5,616,478; 5,736,257 and 5,741,700. These techniques provide an array of porous polymer gel pads. These porous polymer gel pads are functionalized and probes, such as DNA probes, are bound to the polymer pad. The porous polymer gel pads are then freeze dried according to the present invention. Freeze drying can be by freezing the array of porous gel pads to 0° C. to liquid nitrogen temperature and then removing water under vaccum.

The macroporous polymer matrix of the invention was prepared by: (1) fabricating a conventional porous polymer matrix and freezing drying the conventional matrix. The freeze drying results in an increased pore size from less than 1 micron in diameter to 5 to 10 microns in diameter.

EXAMPLE 1

The following procedure was used for preparation standard biochip array.

Cleaning Procedure for Microscope Slides

In an acid hood, pour 100 ml of double distilled water into a 500 mL glass beaker. Add 30 mL of hydrogen peroxide ($H_2O_2$) to the beaker, and then, very carefully add 70 mL of concentrated sulfuric acid ($H_2SO_4$) to the beaker. Pour the solution into a small polypropylene bucket or pan. Place 1"×3" Corning brand microscope slides in a polypropylene electronic wafer case and very carefully place the case in the acid/peroxide solution. Allow the microscope slides to soak in the solution for 5 minutes and then remove them the solution. Transfer the wafer case to a large beaker filled with double distilled water. Remove the wafer case form the beaker and pour the water down the drain. Fill the beaker with double distilled water and rinse each slide (individually) under a stream of fresh double distilled water and dry each slide under a stream of nitrogen (only handle the microscope slides by their edges using forceps and latex gloves). If spotting is present on any microscope slide, rinse it again under a stun of distilled water until no spots are present. Place the microscope slides in a microscope slide box. Close the box and place it in a clean, dessicator cabinet.

Treatment of Microscope Slides with Methacryloxypropyl-trimethoxysilane (MAPS):

In a chemical fume hood, prepare a 10% solution of methacryloxypropyltrimethoxysilane (MAPS) by adding 10 mL in dry methanol. Add the solution to a large Kettle reaction flask in a chemical fume hood. The Kettle flask should be equipped with a reflux condenser, a drying tube filled with calcium sulfate, thermometer, and a beating mantle. Add 20 clean and dry microscope slides to the Kettle flask. Seal the Kettle flask and heat to 50 degrees C. Maintain the temperature of the solution of Kettle flask Heat the kettle flask at to proceed for 40 minutes, turn off the heating mantle, and allow the solution to cool to ambient.

Transfer the microscope slides from the MAPS solution and immediately immerse them into a solution of electronic's industry grade isopropyl alcohol. Remove the microscope slides from the isopropyl alcohol solution individually and rinse each of them under a stream of fresh isopropyl alcohol. Immediately dry the microscope slides under a stream of dry, filtered nitrogen to prevent spotting. If spotting is present, an additional isopropyl alcohol rinse will be required. Store the MAPS derivatized microscope slides in a clean, dry environment in a closed microscope slide case.

Polyacrylamide Biochip Polymerization:

Acrylamide/bisacrylamide/aldehyde2 solution: In a chemical fume hood, make up a quantity of aldehyde copolymer 2 mix solution by adding 50 uL of aldehyde copolymer 2 to 400 uL of sterile, distilled water in a sterile 1.7 mL microcentrifuge tube. To a sterile, 10 ml polyethylene conical centrifuge tube, add 0.475 g of acrylamide and 0.025 g of bisacrylamide (19:1) from Gibco. Add 6 ml of 1×TBE buffer and 4 ml of glycerol (using a 1000 uL pipetman). Glycerol is viscous, so in order to ensure that all of the glycerol is added to the solution, wash the pipette tip several times by repeatedly pulling and pushing the acrylamide solution into and out of the pipette tip. In the fume hood, add 320 uL of the aldehyde copolymer 2 mix solution to the acrylamide solution and, using a Vortex Genie, mix the solution thoroughly. Pour the solution into a 10 mL disposable syringe, push the solution through a nylon or teflon 0.2 um syringe filter, and collect the filtrate in a sterile, 10 mL polyethylene conical centrifuge tube.

In a chemical fume hood, for each biochip, add 100 uL of the acrylamide/bisacrylamide/aldehyde2 solution, 0.4 uL of 1 mM methylene blue, and 1.2 uL TEMED to a sterile, 1.7 mL microcentrifuge tube. Cover the lid of the microcentrifuge tube with a perforated cap and pull 600 torr of negative pressure on the solution for 5 minutes.

Place two 0.001" (approximately 25 um) plastic shims on the metal side of a quartz-TiCr photolithography mask for gel pad array. Using a pipetteman, spread 100 uL of the degassed acrylamide solution onto the metal surface of the mask. Carefully place a MAPS treated microscope slide onto the mask, taking care to prevent the accumulation of air bubbles between the mask and the microscope slide. Clamp the mask to the microscope slide using four small black binder clips.

Place the mask-microscope slide sandwich mask side up onto a non-reflective, small black platform under the UV, light of about 200–300 nm which should be equilibrated to 40° C., and allow the slide to heat up for 1 minute. Expose the mask at 18 mW/cm$^2$ for 7 minutes.

After 7 minutes, remove the substrate from the DUC, remove the binder clips, and immerse the substrate in distilled water. Using a single edge razor blade, carefully pry the biochip away from the surface of the mask. Soak the biochip in distilled water for 5 minutes, rinse under a stream of sterile, distilled water for one minute, and allow the biochip to dry under ambient conditions in a clean, dry environment. Store the biochip in a covered microscope slide container in a clean, dry environment.

DNA Hybridizations

Biochip Activation:

Place the biochip in a Wheaton jar filled with 2% TFA. After 10 minutes, rinse the biochip under a stream of distilled $H_2O$ for one minute. Place the biochip in a Wheaton jar filled with 100 mM $NaIO_4$. After 15 minutes, rinse the biochip under a stream of distilled $H_2O$ for one minute. Place the biochip in a Wheaton jar filled distilled $H_2O$ and let stand 15 minutes. Rinse the biochip under a stream of distilled $H_2O$ for one minute, dry under a stream of dry nitrogen, and place it in clean, dry environment and dry to ambient humidity.

In a chemical fume hood, place the biochip in a Wheaton joar filled with 2% Repel Silane. After 10 minutes, rinse the biochip under a stream of 95% ethanol, then rinse it immediately under a stream of distilled $H_2O$ (do not permit the ethanol to evaporate from the surface of the biochip). Dry the biochip under a gentle stream of dry, filtered $N_2$. Biochips should be utilized within one day following activation.

Probe Dispensing

Using a Packard eight head nanofluidic dispensing tool, dispense one 300 uM drop of 5' amino labeled, 3' Cy3 labeled positive control oligonucleotide (dissolved in sterile, distilled $H_2O$) onto each 100×100 um positive control array element location. Using a Packard eight head nanofluidic dispensing tool, dispense one 300 uM drop of 5' amino labeled negative control oligonucleotide (dissolved in sterile, distilled $H_2O$) onto each 100×100 um negative control array element location. Using a Packard eight head nanofluidic dispensing tool, dispense one 300 uM drop of 5' amino labeled oligonucleotide probe (dissolved in sterile, distilled $H_2O$) onto each 100×100 um array element location. Place the biochip to dry in a clean, dry environment and allow it to stand for two hours.

Probe Stabilization & Capping

Using a separatory funnel, wash 100 mL of HPLC grade $CHCl_3$ with two 100 mL volumes of 0.2 M dibasic sodium phosphate To 40 mL of the $CHCl_3$, add 650 uL of 0.1 M borane-pyridine complex and mix the solution well.

Place the biochip army side up in a glass petri dish. Carefully pour the borane-pyridine solution over the biochip until the array elements are completely covered. Carefully overlay the borane-pyridine solution with 0.2 M dibasic sodium phosphate (approximately 45 mL). Cover the petri dish and allow the biochip to stand under the borane-pyridine solution for 2 hours at ambient temperature. 1After 2 hours, carefully remove the aqueous layer with the aid of a Pasture pipette.

Remove the biochip and carefully rinse it under a gentle stream of sterile, distilled $H_2O$. Rinse the biochip under a gentle stream of 95% ethanol. Rinse with $H_2O$ and ethanol two times; finish with a final rinse of distilled $H_2O$. Dry the biochip under a gentle stream of dry, filtered $N_2$.

Make up 50 mL of 0.1 M sodium borohydride solution by dissolving powdered sodium borohydride in distilled $H_2O$. Pour 45 mL of the solution into a 50 mL polyethylene conical centrifuge vial. Place the biochip in the vial and let stand at room temperature 15 minutes with the cap loosened. Remove the biochip form the solution and rinse under a gentle stream of sterile distilled $H_2O$. Place the biochip in a fresh 50 mL, polyethylene, conical centrifuge vial. Fill the vial with 45 mL of sterile distilled $H_2O$. Seal the vial and heat at 60° C. for 30 minutes. Remove the biochip from the vial and analyze the fluoresence of the biochip to evaluate the intensity of the positive control and the background fluorescence level. Place the biochip in a clean, dark, dry environment and allow it to dry to ambient humidity.

The conventional porous polymer gel pad array was immersed in de-ionized water for half an hour to yield a completely hydrated gel pad array. The hydrated gel pad array should swell about 3–6 times as compared to the dehydrated dry gel pad array. The hydrated gel pad array was then instantly frozen by dipping into liquid nitrogen. The frozen gel pad array was then transferred into a vacuum chamber chilled to below −25 C. The vacuum chamber was then evacuated by a turbo pump to $2\times10_{-6}$ torr and maintained re (<−25 C) for 10 hours until the gel pad array is dried.

Hybridization Result Comparison

A hybridization comparison study was carried out on a standard gel pad and a freeze dried gel pad with the protocol outlined below. The target is a segment of gene from human Y chromosome (334 bp). The relative fluorescent intensity is recorded with a Fluorescent Scanner from General Scanning with laser power of 65% and PMT of 60%. As shown in the table, the relative fluorescent intensity from freeze-dried porous polymer gel pads is almost twice of that from conventional gel pads. The signal to noise ratio has also been improved by 5–6 times.

| Gel Pads | Freeze-dried | Standard |
|---|---|---|
| Relative Integrated Fluorescent Intensity | 391,859 | 222,908 |
| Signal/Noise Ratio | 46 | 8 |

Hybridization Protocol For 334 bp

Reagents:
20×SSC
PN3 probe (5'-L,TAA,CTC,TAA,TTT,ACC,TCC,CC-3', where L is an amine linker)
Hybridization Chamber
Gel Pad Array
MJ Thermal Cycler with Tower Alpha Unit a. Dispense and attach 300 uM of PN3 probe on gel pads for comparison purpose leaving some blank on.

b. Make up a hybridization solution (0.28 uM of Target) in 4×SSC buffer.

c. Place the array slide on the hybridization chamber d. Pipette 60 uL of the target solution into the hybridization chamber, seal the opening with aluminum adhesive tape.

e. Place the hybridization chamber on the thermal cylcer tower and use the following cycle: 94 C, 3 min; 65 C, 5 min; 60 C, 5 min; 55 C, 5 min; 40 C, 12 hours; 4 C, forever (until removed)

f. Remove the array slide and rinse briefly at room temperature with 1×SSC buffer and place the array into a 1×SSC solution in a conical tube, and let it rotate at room temperature for 30 min using rotisserie.

g. Wash the array one time with deionized water and then analyze fluorescence on scanner.

The above examples are intended to illustrate the present invention and not to limit it in spirit or scope.

What is claimed is:

1. A method of making an oligonucleotide array comprising:
   a. providing an array of porous polymer gel pads on the surface of a solid support;
   b. adding an oligonucleotide probe to each of said porous polymer gel pads;
   c. freezing said array of porous polymer gel pads comprising said oligonucleotide probes to produce a frozen array said porous polymer gel pads being hydrated prior to freezing; and
   d. drying said frozen array of porous polymer gel pads by sublimation for a time sufficient to increase the pore size of each of said porous polymer gel pads.

2. An oligonucleotide array prepared by the method of claim 1.

3. The method of claim 1 wherein said freezing is at liquid nitrogen temperatures.

4. An array produced by the method of claim 1, wherein said oligonucleotide probe is a DNA probe.

5. An array produced by the method of claim 1, wherein said oligonucleotide probe is a RNA probe.

* * * * *